United States Patent [19]

Kieran et al.

[11] Patent Number: 4,728,239

[45] Date of Patent: Mar. 1, 1988

[54] CAP LINING MACHINE

[75] Inventors: Thomas G. Kieran, Tempe; Newton Rickenbach, Mesa, both of Ariz.

[73] Assignee: Top Seal Corporation, Phoenix, Ariz.

[21] Appl. No.: 920,113

[22] Filed: Oct. 17, 1986

[51] Int. Cl.⁴ ............................................. B21D 51/46
[52] U.S. Cl. ........................................ 413/64; 413/63; 83/123; 83/128
[58] Field of Search ............... 413/9, 58, 63–65; 493/75, 76, 94, 95, 108; 83/123, 128, 129, 136

[56] References Cited

U.S. PATENT DOCUMENTS

| | | | |
|---|---|---|---|
| 1,135,244 | 4/1915 | Young | 413/64 |
| 1,463,915 | 8/1923 | Widell et al. | 413/65 |
| 1,476,706 | 12/1923 | Furber | 83/123 |
| 1,738,781 | 12/1929 | Lundell et al. | 413/64 |
| 1,809,341 | 6/1931 | Jensen | 413/64 |
| 1,833,946 | 12/1931 | Johnson | 413/64 |
| 1,908,898 | 5/1933 | Johnson | 413/64 |
| 2,225,342 | 12/1940 | Hyatt | 83/136 |
| 2,391,381 | 12/1945 | Belada | 413/58 |
| 2,435,589 | 2/1948 | Hoffecker | 413/62 |
| 2,600,393 | 6/1952 | Cohn | 156/518 |
| 2,912,042 | 11/1959 | Jenkins | 413/9 |
| 3,486,959 | 12/1969 | Podesta | 156/262 |
| 4,341,498 | 7/1982 | Ellis | 413/3 |
| 4,568,406 | 2/1986 | Kieran | 156/355 |

Primary Examiner—Frederick R. Schmidt
Assistant Examiner—Robert Showalter
Attorney, Agent, or Firm—LaValle D. Ptak

[57] ABSTRACT

A cap lining machine constructed with a minimal number of mechanical parts includes a spring-biased shuttle feed for moving the caps into the punching and insert position. A cam pulls the shuttle back against the bias of the spring; so that upon release by the cam, the shuttle pushes the caps to the insert position. If a cap becomes jammed, the spring-biased shuttle simply is held back against the spring bias to prevent breaking of caps or parts of the machine. A tamper also is concentrically mounted within a hollow punch and is controlled by a rocker arm assembly to press punched inserts out of the lower end of the punch and seat them into the caps. The tamper may be cleaned by removing it completely from the top of the punch.

5 Claims, 13 Drawing Figures

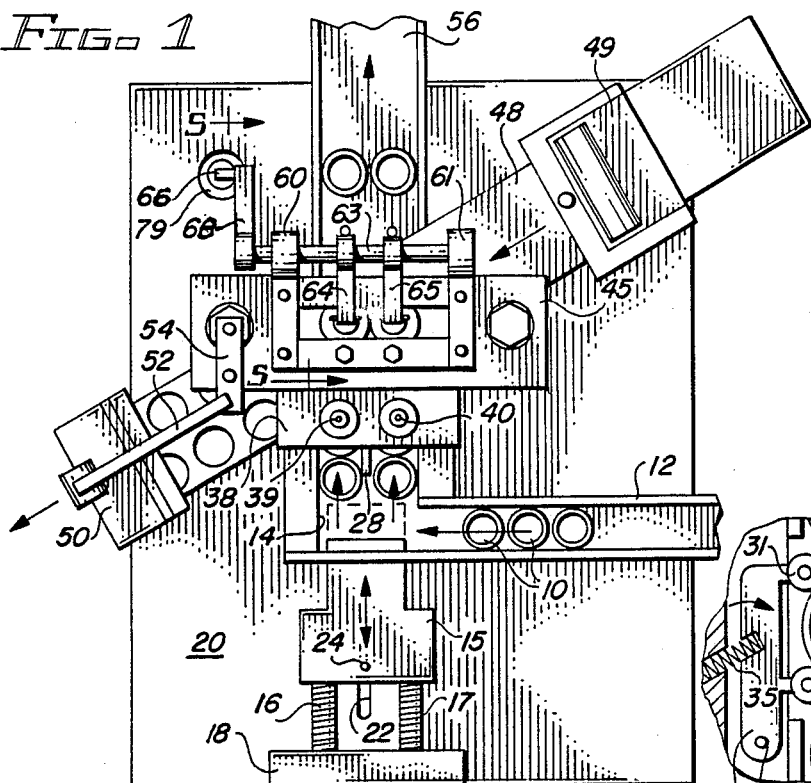
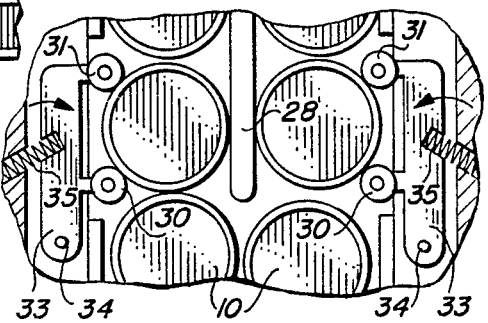
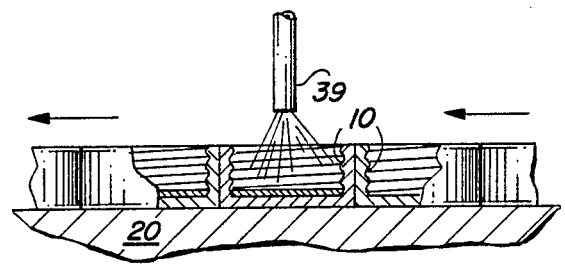
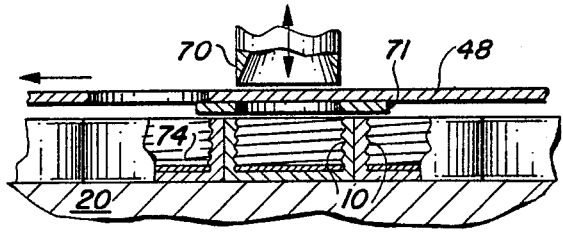
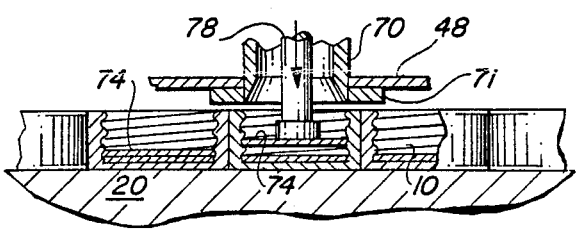

CAP LINING MACHINE

BACKGROUND

Container closures or caps of the reusable type are utilized on a wide variety of products. Typical products include beverages, vitamins, condiments, and the like. Such caps, whether made of plastic or metal, are provided with liners in the form of coated aluminum foil membranes, plastic-coated paper, or other suitable material.

In assembling a liner into a cap or closure for containers, machines generally are employed which feed the inverted caps sequentially to an assemblying station. A strip of lining material or liner also is fed to the assemblying station and is positioned over the inverted caps, where the liners are punched from the strip of lining material and are assembled into the caps. The movement of the caps and lining material to the assembly station, along with the movement of the punch and other assemblying mechanisms generally is controlled by a mechanically interlocked machine involving a large number of cams, gears, and the like. Because of the complex mechanical interaction of parts which are required for the operating sequence, relatively large electric motors also are required to power such machines.

The nature of most cap-lining machines which currently are used also is such that if a change from one cap size or diameter to another is desired, significant modifications must be made to the machine. This requires skilled mechanics and results in considerable "down time" to effect the changeover from one size of caps to another. In many installations, where large numbers of caps of different sizes are manufactured and lined, it is not uncommon to have different machines set-up to handle different sized caps, even though such machines frequently sit idle for long periods of time between the times caps of the particular size for which a machine has been set up are to be lined. In addition, because of the substantial mechanical complexity of most cap lining machines, many opportunities for mechanical failure and the wearing out of parts exist. Consequently, it also has been common practice to provide idle back-up machines for high production facilities to prevent the interruption of production whenever machines require maintenance, which is frequent.

In many cap lining machines of the prior art, if for some reason movement of caps through the punch and insert mechanism should somehow fail, the machines continue to attempt to feed additional caps to the mechanism resulting in a high likelihood of jamming of the machine and a high potential for breaking of machine parts. In the event of such a failure, expensive parts must be replaced, a considerable amount of skilled labor is required and a significant amount of machine "down time" results.

Some cap lining machines simply rely upon the downward movement of the punch through the web of liner material to seat the liner insert into the cap. If this is done, it is necessary for the punch travel to be downward as far as possible into the cap to insure a tight downward pressure on the insert into the cap. This creates another potential for failure since if for some reason the cap feeding mechanism fails to sequentially feed caps, it is possible for the punch and insert mechanism to attempt to insert a second liner insert (or several liner inserts) into a cap at the liner inserting station of the machine. Because of the very close tolerances involved, this results in jamming of the punch and frequently expensive mechanical failures of gears, cams, and levers in the machine.

A cap lining machine which overcomes most of the problems outlined above in the prior art is disclosed in the patent to Kieran U.S. Pat. No. 4,568,406. In particular, sensing switches are employed in the Kieran machine in conjunction with an electric control system to prevent the machine from moving through a subsequent step in its operation unless all previous steps of operation have been properly completed in proper sequence. Operation interruption of the machine of Kieran is accomplished in a jam proof manner. The machine of Kieran U.S. Pat. No. 4,568,406 employs air cylinders in place of mechanical cam-operated mechanisms for the cap advance and punching operation.

In machines of the prior art, including that of Kieran U.S. Pat. No. 4,568,406, however, if the punch itself is not used to seat the cap insert firmly into the cap, it is necessary to provide an additional tamper mechanism, generally located downstream from the punch mechanism in the path of movement of the caps through the machine. For mechanical machines, this requires an additional set of cams synchronized in operation to the operation of the cap feed and punching mechanism. In a machine of the type disclosed in the Kieran U.S. Pat. No. 4,568,406, an additional air cylinder set or the like would be necessary for operating such a tamper mechanism. All of this adds to the complexities of such prior art machines.

It is desirable to provide a cap lining machine which overcomes the disadvantages of the prior art mentioned above and which minimizes the potential for damage in the event caps should become jammed in the machine or fail to move through it for some reason.

SUMMARY OF THE INVENTION

Accordingly it is an object of this invention to provide an improved cap lining machine.

It is another object of this invention to provide an improved cap lining machine of a modular type.

It is an additional object of this invention to provide an improved cap lining machine which reduces the possibilities of damage in the event of jamming in the feeding of caps through the machine.

It is a further object of this invention to provide an improved cap lining machine having concentric punch and tamper mechanisms.

It is yet another object of this invention to provide a cap lining machine with improved safety features.

It is still an additional object of this invention to provide a cap lining machine having tamper mechanisms which are easily removed for cleaning and replacement.

In accordance with the preferred embodiment of this invention, a cap lining machine has a liner punch with a hollow body which carries a tamper apparatus concentrically mounted within the hollow body of the punch. A web of liner material is supplied under the punch in synchronism with a supply of caps into which linear inserts are to be placed, and the punch and tamper operate in synchronism with one another for punching out inserts and inserting them into the caps.

BRIEF DESCRIPTION OF THE DRAWINGS

FIG. 1 is a top view of a preferred embodiment of the invention;

FIGS. 2A and 2B illustrate details of the operation of a portion of the embodiment shown in FIG. 1;

FIG. 3 illustrates additional details of the embodiment shown in FIG. 1;

FIGS. 4A through 4C illustrate details of a sequence of operations of the embodiment as shown in FIG. 1;

DETAILED DESCRIPTION

Figure 5A:
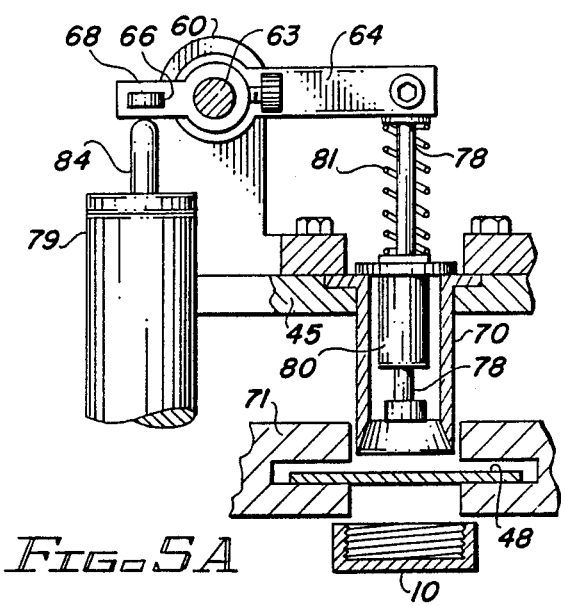
FIGS. 5A through 5C are partially cut-away side views of a portion of the embodiment shown in FIG. 1.

Reference now should be made to the drawings in which the same or similar reference numbers are used throughout the different figures to designate the same or similar components. FIG. 1 is an overall top view of a preferred embodiment of a cap lining machine made in accordance with the invention. Closures or caps 10 to be lined are supplied from a supply bin (not shown) through a supply chute 12, the width of which is slightly wider than the outside diameter of the caps 10. This permits the caps 10 to be fed under the force of gravity or the like in a single line through the chute 12 to a cap supply channel 14. As illustrated in FIGS. 1 and 2, the channel 14 is wider than the channel 12, and is illustrated in these figures as having a width sufficient to accommodate two of the caps 10 in a side-by-side relationship.

As illustrated most clearly in FIGS. 2A and 2B, the caps 10 in the channel 12 are moved until the left-most cap 10 in the line of caps abuts the inside left edge of the channel 14. This occurs when a shuttle 15 is withdrawn to its retracted position as shown in FIG. 2A. The shuttle 15 is mounted on a base plate 20 for reciprocating movement into and away from the channel 14 as indicated by the double-ended arrow in FIG. 1. A pair of coil springs 16 and 17, compressed between an abutment 18 and spring holding channels in the shuttle 15 (such channels are shown most clearly in FIGS. 7 and 8), normally bias the shuttle 15 into its forward position extending into the channel 14, as illustrated in FIG. 2B. The shuttle 15 is retracted to the position shown in FIG. 2A and in FIGS. 7 and 8 by means of a cam 91 operating on a cam follower 90 as a shaft 92 rotates. This is illustrated clearly in FIGS. 7 and 8. As the cam 91 is rotated to release the shuttle 15, the springs 16 and 17 press it into the channel 14 to move the two caps 10 located in front of the shuttle 15 into the channel 14 as illustrated in FIG. 2A. This operation continues in a repeating fashion to successively move pairs of caps 10 from the chute 12 into the channel 14 in a step-by-step operation, the speed of which is controlled by the speed of rotation of the shaft 92 operating the cam 91. A slot 22 is provided in the base plate 20 for engagement by a guide pin 24 extending through the shuttle 15 to guide or control the reciprocating movement of the shuttle 15. Although only a single slot 22 and guide pin 24 are illustrated, two or more such slots and pins or their equivalents may be used to insure the proper reciprocating movement of the shuttle 15.

The caps 10 then are moved in a step-by-step sequence beneath a pair of glue gun nozzles 39 and 40, and from the glue gun nozzles to a pair of reciprocating punches mounted on a punch holding block 45. The punch block 45 reciprocates in a plane perpendicular to the plane of the base plate 20 to move a pair of identical punches 70 between an upward retracted position and a lower punching position in synchronism with the operation of the shuttle 15.

An elongated web of liner material 48 is moved under the control of a liner or paper feeder 40 diagonally across the location of the punches 70 in the punch block 45 in synchronism with the operation of the block 45. Each operation of the punches 70 cuts a pair of liner inserts which then are tamped into the side-by-side pair of caps 10 under the punches to seat the liner seat firmly in the caps 10 where they are held by the glue placed in the earlier stage by the glue guns 39 and 40. The perforated liner web then is passed through a paper cutter 50 which cuts it into small strips for more efficient handling as scrap. A receptacle (not shown) may be located to receive the shredded waste paper obtained from the cutter 50. The cutter 50 is a reciprocating knife cutter mounted for reciprocal operation by means of a lever 52 which overlies a mating lever 54 attached to the punch block 45. As the punch block 45 rises and lowers under control of a cam (not shown) driven by a motor for the system, the reciprocating action causes a rocking motion of the lever arm 52 which in turn operates a knife in the cutter 50 to continuously slice the scrap web 48 in synchronism with the operation of the rest of the machine. The completed caps with liners inserted and glued in place then pass through an output chute 56 to a suitable receptacle.

A single motor driven cam assembly may be used to operate the cam 91 on the shaft 92 and to provide the reciprocating motion for the punch block 45. The motor and drive shaft necessary for accomplishing this may be of any suitable type, and for that reason no details of this portion of the machine have been illustrated.

It is apparent that when both the chute 10 and the channel 14 are full of caps 10, each operation of the shuttle 15 moves a pair of caps in the channel 14 one place upward, as viewed in FIGS. 1 through 3 or to the left as viewed in FIGS. 4A through 4C. After the shuttle 15 retracts, the next pair of caps 10 in the chute 12 moves down the chute 12 and engages the left-hand side of the channel 14 as viewed in FIGS. 1 and 2, to place this next pair of caps 10 in position for movement by the shuttle 15 in its next cycle of operation.

Two cap positions upward, as viewed in FIG. 1, or to the left, as viewed in FIG. 4A, a pair of caps are located beneath the glue guns 39 and 40. One of these glue guns 39 is shown in FIG. 4A which illustrates the deposit of a measured amount of glue in the bottom of the inverted cap 10 positioned beneath the glue gun. The operation of the glue guns 39 and 40 is synchronized in any suitable manner with the operation of the punch block 45 and shuttle 15.

Two positions to the left of the glue gun position shown in FIG. 4A, or upward as viewed in FIG. 1, a pair of caps 10 are centered beneath the punches 70 in the liner punch and insert station beneath the punch block 45. This centering is accomplished by means of three point centering devices located on opposite sides of the channel 14. In the center of the channel 14, a divider wall 28 is provided and projects between adjacent pairs of caps 10, as shown most clearly in FIGS. 1 and 3. The opposite sides of this wall 28 comprise one point of the three point centering device for each of the two caps 10 for the pair of caps located in the punching and insert position or station of the machine. Opposite sides of the channel 14 have openings or spaces cut through them to permit a pivoted, spring-biased centering device to engage the adjacent cap 10 at two spaced-apart points on a pair of centering rollers 30 and 31, carried on a pivoted arm 33. The arm 33 pivots about a pivot 34 located on the entering side of the openings in the channel 14, as shown most clearly in FIG. 3. Each of the arms 33 is biased by a corresponding compression spring 35 to extend the rollers 30 and 31 on each of the centering devices into the space between the corresponding side walls of the channel 14 and the projection 28. As illustrated in FIG. 3, the springs 35 extend between the arms 33 and a portion of the block or base 20 on which the channel 14 is mounted. As is readily apparent from an examination of FIG. 3, each time a new cap 10 is moved into position, so that it is engaged by both of the rollers 30 and 31 on its corresponding centering device 33, the cap automatically is center in the same position as each previous cap by means of the center rollers 30 and 31.

Once the caps 10 are in position between the corresponding rollers 30 and 31 of the centering devices, which causes the caps to be centered beneath the punch location of the punch block 45, the punch block 45 is lowered to punch out a liner insert, as illustrated in FIGS. 4A and 4B and FIGS. 5A through 5C. The punches 70 move downwardly through the web 48 of liner material as illustrated in FIGS. 4A and 4B. The downward movement of the punches 70, however, is to a depth sufficient to clear the die 71 located beneath the web of material, but it is above the bottom of the cap 10; so that the punch 70 is not used to press the severed liner insert 74 into place in the bottom of the cap 10.

Insertion of the severed liner insert 74 firmly into the caps 10 is accomplished by means of a tamper 78 which is concentrically mounted within the hollow body of the punches 70. Each of the punches 70 are removably mounted on the punch block 45 by means of a pair of clamping bars 82 and 83. The punches 70 are inserted through circular openings in the block 45 and include outwardly extending flanges which seat in a circular depression surrounding the holes through the block 45, as shown in FIGS. 5A through 5C and FIG. 6. The upper edges of the punch block then are secured in place by means of a pair of clamping bars 82 and 83, which are removably mounted onto the block 45 and extend over the flanges on the top ends of the punches 70 to hold them firmly in place in the block 45. Consequently, the punches 70 move with the block 45 as it recirprocates from the retracted position FIG. 5A to the punching position shown in FIG. 5B.

Figure 5B:
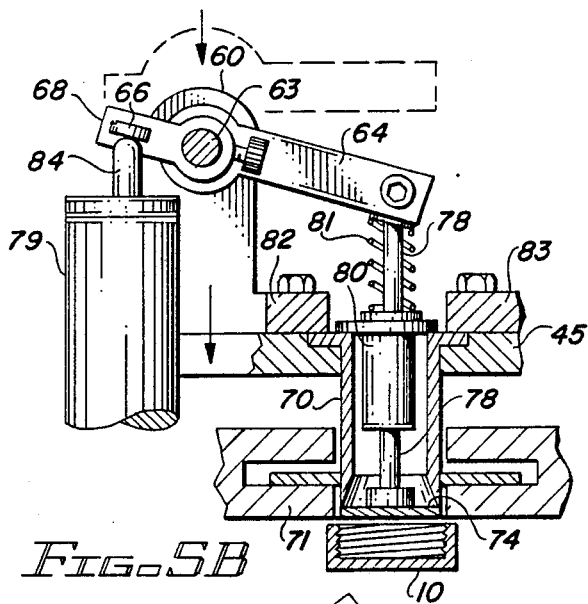

As illustrated in FIG. 5B, the lowermost point of travel of the lower end of the punches 70 to sever the liner insert 74 from the web 48 is to the lower edge of the die block 71 located beneath the punch. This location is above the top of the cap 10 and significantly above the bottom of the cap 10 into which the insert 74 is to be pressed.

Figure 5C:
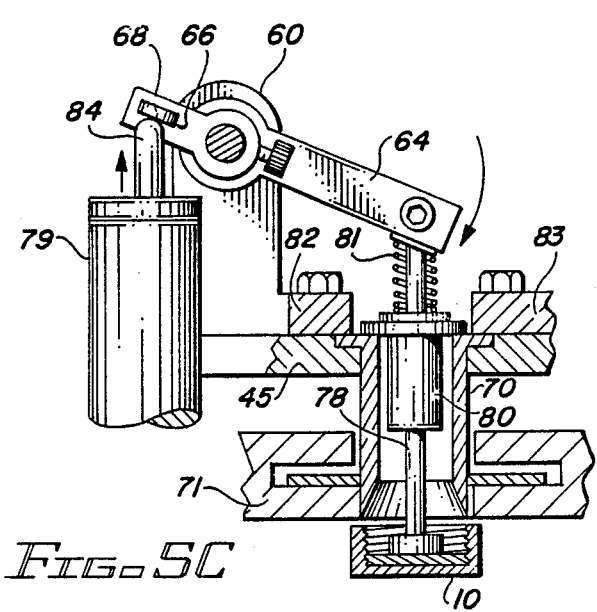
Figure 6:
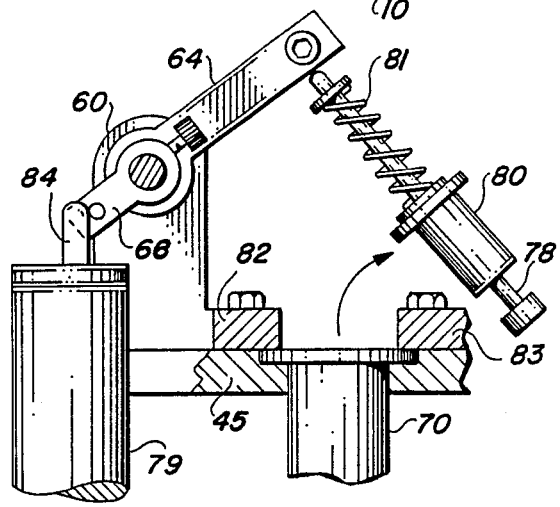
FIG. 6 illustrates an additional feature of the embodiment shown in FIGS. 5A through 5C.

To accomplish the placement of the liner insert 74 into the caps 10, a tamper 78 is concentrically mounted in a cartridge 80 within each of the hollow punches 70. A flange on the top of the cartridge 80 extends outwardly over the upper end of the punches 70 for support; and the tamper 78 is spring-biased to a upward or retracted position, as shown in FIG. 5A, by means of a compression spring 81 extending between the top of the cartridge 80 and a circular flange attached to the upper end of the tamper 78. The flange on the upper end of each of the tampers 78 then engages the end of a rocker arm 64 and 65, respectively, for the two punching positions shown in FIG. 1. In FIGS. 5 and 6, only the rocker arm 64 is shown. The same construction is used for the other punch location beneath the rocker arm 65 of FIG. 1.

The rocker arms 64 and 65 are attached to a shaft 63 which is mounted for rotation between a pair of rocker arm support blocks 60 and 61, shown most clearly in FIG. 1. One of these blocks 60 is illustrated in FIGS. 5 and 6. The left-hand end of the shaft 63, as shown in FIG. 1, extends through a bearing in the block 60 where it is attached to an operating lever arm 66 extending to the left of the shaft 63, as viewed in FIGS. 5 and 6. The outer end of the lever 66 has a removable projection 68 mounted on it. This projection 68 extends to one side out over a plunger 84 mounted in an air cylinder 79 attached to the base 20.

When the punch block 45 is in its retracted position, as shown in FIG. 5A, the projection 68 is located in a position just touching or spaced slightly above the end of the plunger 84. As the punch block 45 is drawn downwardly to commence and complete the punching cycle, the projection 68 engages the end of the plunger 84, causing the rocker arm comprising the lever 66, shaft 63, and levers 64 and 65 to rotate in a clockwise direction about the shaft 63, as shown in FIG. 5B. The ratio of the lever arm 66 to that of arms 64 and 65 is 1:2. This causes the right-hand end of the lever 64 to move the upper end of the tamper 78 downwardly against the bias of the spring 81 at a rate and to a distance twice that of the downward movement of the punch 70. As the punch 70 completes the severance of the insert liner 74 from the web 48, the enlarged end of the tamper 78 engages the top side of the liner insert 74, as shown most clearly in FIG. 5B. Continuation of the downward movement of the punch 70 and the tamper 78 against the bias of the spring 81, however, causes the tamper 78 to move past the end of the punch 70, as indicated in FIG. 5C. This firmly seats the insert liner 74 in the bottom of the cap cam 10 where it is held by the glue previously inserted by the glue dispenser 39 or 40.

The air cylinder 79 and plunger 84 act as a gas spring to allow cushioned seating of the liner in the cap 10. This "gas spring" also absorbs the consequences of an upside-down cap 10 or jam-up without damage to the machine.

The punch block 45 then rises from the position shown in FIG. 5C to the retracted position shown in FIG. 5A, ready to commence another cycle of operation following the pushing of a new pair of caps 10 into position by the plunger 15.

Since the punches 70 do not extend downwardly into the caps 10, if there should be a malfunction of the machine which would prevent additional caps 10 from moving through the machine, the result simply would be to stack up two or more liner inserts 74 into a cap 10. There would be no strain caused on the cam and gear mechanism, however, for affecting the reciprocating movement of the punch block 45. The resistance in pressure would be absorbed in the air cylinder 79 through the plunger 84. Since no mechanical rigid parts are involved in this part of the operation, no damage again would result from such a potential malfunction.

From time to time it is necessary to clean the tampers which are used in cap lining machines. In prior art machines, the location of the tampers is such that it is possible for an operator to risk injury to his fingers, since the tampers generally must be removed from below some type of a moving block in order to clean them or replace them. The tampers of the present system, however, are modular and each are loosely carried in the cartridge 80 which is inserted into the punches 70. The external dimensions of the cartridges 80 are selected to provide a relatively close fit within the inside of the cartridge 70 to cause the tamper 78 to be substantially, co-axially aligned with the cylindrical punch 70. As illustrated in FIGS. 5A through 5C, a relatively large space is shown for the purpose of more clearly illustrating the separate parts which are utilized. In actual practice, the cartridges 80 are substantially in contact with the inner wall of the punch 70.

The cartridges 80 may be removed simply by lifting upward on the upper end of the tamper 78. To accomplish this, the tab 68 is removed from the lever arm 66 and the relative location of the lever arm 66 with respect to the air cylinder 79 is such that it may be rotated counter-clockwise to the position shown in FIG. 6. This then moves the upper end of the rocker arm 64 out of the way, so that the tamper may be completely removed for cleaning or replacement as desired. Reassembly is accomplished simply by reinserting the cartridge 80 into the appropriate punch 70 and reversing the steps, with the final step of reattaching the tab 68 to the end of the lever arm 68; so that the tab 68 overlies the upper end of the plunger 84.

Figure 7:
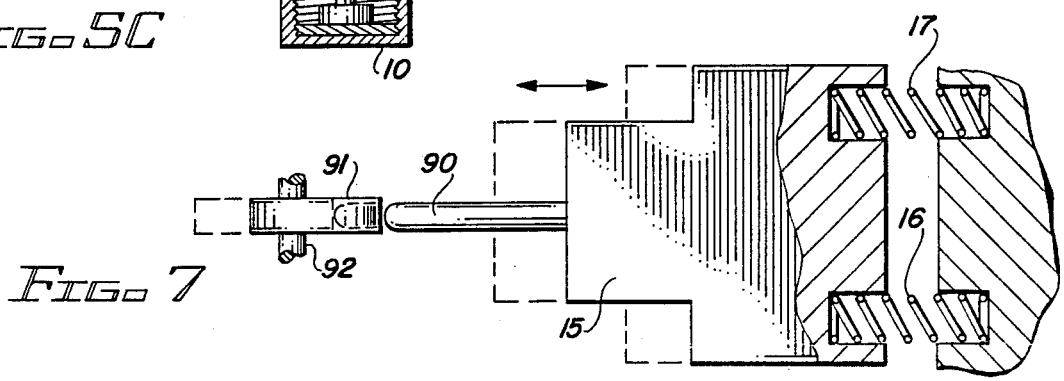
FIGS. 7 and 8 are a top view and a side view, respectively, of a portion of the mechanism shown in the embodiment of FIG. 1.
Figure 8:
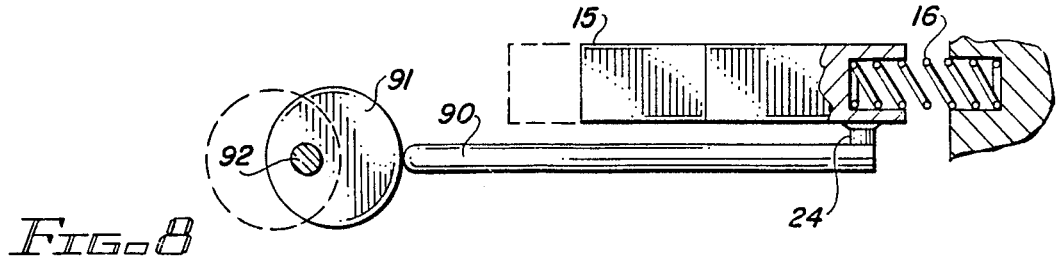

Another "anti-jamming" safety feature which is inherent in the structure of the machine which has been disclosed is in the manner of operation of the shuttle 15. As described above, the shuttle 15 is driven by the springs 16 and 17 to push each new pair of caps 10 into position in the channel 14. If for some reason the channel 14 should become jammed, the shuttle 15 would be withdrawn by the cam 91 to the position shown in FIG. 2A. Upon release the springs 16 and 17 would drive the shuttle 15 forward, but if the channel 14 were jammed with caps, the springs could not move the shuttle 15 any further forward than illustrated in FIG. 2A. The next rotation of the cam would have little or no effect on a change of position of the shuttle 15, and the shuttle would remain pressed to the right, as illustrated in FIGS. 7 and 8, against the pressure of the springs 16 and 17 until the jam in the channel 14 were corrected. Since the cam is not used to drive the shuttle 15 forward into the channel 14, but only to withdraw the shuttle 15 from the channel, no mechanical parts can be damaged even though the machine may be completely jammed with caps 10. This is a significant feature both from the safety standpoint and from the standpoint of protection the machine itself from damage in the event a jam-up should occur.

Since the machine is operated from beneath by a single cam having a single cam lobe or two or three cam lobes mounted on a single shaft, the change over from one size of caps to another simply can be effected by removing the plate 20 from the machine base and reattaching a different plate having different size punches, channels and the like for accommodating different size caps. The points of contact with the cams for the reciprocating movement of the punch 45 and the reciprocating movement of the shuttle 15, along with any timing switches for the glue guns, remain unchanged from the cam positions located beneath the machine. As a consequence, change over from one size of caps to another readily may be accomplished in a relatively short period of time as contrasted with prior art machines.

The foregoing description of a preferred embodiment, as illustrated in the drawings is to be considered as illustrative only and not as limiting. Various modifications may be made by those skilled in the art without departing from the true scope of the invention. For example the particular manner in which the shuttle 15 is biased forward and mounted on the base 20 for example may be modified to include different arrangements of springs, guide channels and the like. The location of the cam follower and the cam 91 may be varied in accordance with the specific requirements of a machine. The configuration of the tamper and the specific details of the rocker arm assembly for operating the tamper also may be varied without departing from the true scope of the invention.

We claim:

1. A cap-lining machine including in combination:

liner punching means having a hollow body with openings in the top and bottom thereof and moveable between retracted and punching positions for punching cap inserts from a liner located adjacent the bottom of said punching means;

liner supply means for supplying liner to said liner punching means;

tamper assembly means inserted into the hollow body of said punching means and having a portion resting on the top of said punching means to support said tamper assembly means in the hollow body of said punching means, said tamper assembly means having a tamper carried thereby for reciprocating movement within said tamper assembly means and said punching means to deliver inserts from said punch means to caps located beneath said punching means when said punching means is in the punching position thereof;

means in said tamper assembly for normally biasing said tamper upwardly within said punching means to a retracted position therein;

abutment means mounted in a fixed position relative to said punching means;

a rocker arm mounted on a pivot for movement with said punching means and comprising a lever extending on one side of said pivot for engagement with said tamper and extending on the other side of said pivot for engagement with said abutment means, said rocker arm lever moving said tamper downwardly through said tamper assembly and said punching means to an extended position below the bottom of said punching means to seat inserts in caps located beneath said punching means as said punching means completes movement from its retracted position to its punching position; and including a removable projection on said rocker arm lever extending over said abutment means for engaging said abutment means when said punching means is moved downwardly for causing said rocker arm lever to pivot in one direction about said pivot, and wherein removal of said removable projection permits said rocker arm lever to be pivoted in the opposite direction to a position out of engagement with same tamper for permitting removal of said tamper assembly from said punching means by lifting said tamper assembly from the top of said punching means.

2. The combination according to claim 1 wherein said tamper is spring biased to a retracted position within said punching means above the bottom thereof when said punching means is in its retracted position; and wherein said means for moving said tamper to its extended position operates to overcome said spring bias to extend said tamper downwardly beyond the bottom of said punching means.

3. The combination according to claim 1 further including means for synchronizing the operation of said liner supply means, punching means, and tamper means.

4. The combination according to claim 1 wherein said tamper assembly loosely rests on the top of said punching means.

5. The combination according to claim 1 wherein said abutment means comprises a resilient member moved downwardly by said rocker arm assembly in response to force exceeding a predetermined amount.

* * * * *